United States Patent Office 2,993,899
Patented July 25, 1961

2,993,899
ACETYLENICALLY UNSATURATED PIPERAZINE DERIVATIVES
Norman D. Dawson, Elkhart, Ind., assignor to Miles Laboratories, Inc., Elkhart, Ind., a corporation of Indiana
No Drawing. Filed Mar. 31, 1958, Ser. No. 724,896
7 Claims. (Cl. 260—268)

This invention relates to a series of new chemical compounds and particularly to acetylenically unsaturated piperazines and certain acid addition salts thereof, which possess pharmaceutically acceptable anions. More specifically, the invention pertains to N-2-propynyl-N'-substituted piperazines and their hydrochloride salts represented by the following general formula:

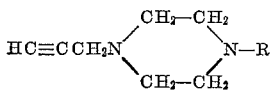

where R stands for hydrogen, lower alkyl radicals containing from 1 to 10 carbon atoms, or aryl, diaralkyl or alicyclic radicals.

The novel compositions of this invention are prepared by reacting an appropriate primary amine, such as an alkyl-, aryl-, diaralkyl-, or alicyclic amine, with N-2-propynyl-bis-2-chloroethylamine or its hydrochloride in accordance with the following graphic equation:

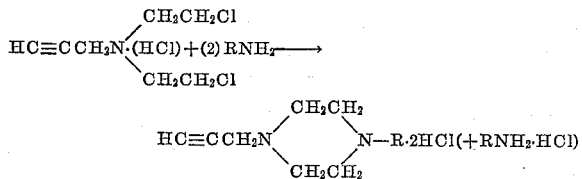

wherein R has the same meaning ascribed to it above.

In the preferred method of forming the present piperazine compounds, the reaction materials and conditions for the above identified reaction are generally as follows:

The tertiary amine hydrochloride used as starting material for the preparation of the new N-2-propynyl-N'-substituted piperazine dihydrochlorides of the present invention is disclosed in my co-pending application, entitled "Hydrohalides of N-Substituted-N-Alkynyl-2-Haloethylamines," U.S. Serial No. 718,427, filed March 3, 1958, now abandoned and assigned to the assignee of the present invention. Where the free N-2-propynyl-bis-2-chloroethylamine is desired as starting material, it is first regenerated from its hydrochloride salt by standard procedure, as for example, by adding one equivalent of a strong alkali to a solution of the salt.

This tertiary amine (hydrochloride) as well as the selected primary amine are separately dissolved in a suitable solvent such as isopropanol, methanol, chloroform, carbon tetrachloride, and the like, which will not enter into the reaction, but which provide a reaction medium. Isopropanol as inert solvent is especially preferred. The amount of the solvent used will depend to a certain extent upon the equipment used. Generally speaking, however, about 5 parts of solvent per part of the N-2-propynyl-bis-2-chloroethylamine hydrochloride and about 1 to 2 parts of solvent per part of the primary amino compound are used.

The reactants, dissolved as described above, are then admixed by treating dropwise over a period of about 30 minutes the N-2-propynyl-bis-2-chloroethylamine hydrochloride solution with the desired primary amine solution, which contains at least a molar excess of the primary amine.

The resulting reaction mixture is then heated, stirred, and refluxed for the period of time necessary to effect the formation of the piperazine ring, usually about 6 to 7 hours. There is no criticality about the reflux temperature of the reaction mixture inasmuch as it depends on and varies with the solvents used.

Isolation and purification of the compounds of the present invention is best achieved by stripping the reaction mixture of solvent and excess primary amine, freeing the piperazine base by addition of water and sodium hydroxide, extracting it into ether or benzene, which is then removed by stripping, distilling the residual brown oil in vacuo, dissolving the distillate in ether, treating the solution with dry hydrogen chloride, separating the desired crystalline dihydrochloride by filtration and purifying the salt by recrystallizations from suitable solvents. Product work-up by other procedures is also feasible as is obvious to those skilled in the art, and such other methods are equally within the purview of this invention.

The new compounds thus prepared have utility as physiologically active agents and particularly as effective vasodilator and adrenergic blocking agents, therapeutically applicable in the treatment of peripheral vascular diseases. Inasmuch as there are structural similarities between adrenergic blocking agents and compounds which antagonize spasmogenic systems, such as histamine (A. Burger, "Medicinal Chemistry," vol. 1 Interscience Publishers, Inc., New York, N.Y., 1951, p. 359), the piperazine compounds of the present invention also exhibit antihistaminic activity. They are further useful as ataractic and anthelmintic agents; and as intermediates for further chemical synthesis.

The invention is illustrated by the following examples which, it is to be understood, are merely illustrative and should not be taken in a limiting sense.

EXAMPLE 1

N-2-propynyl-N'-n-propylpiperazine dihydrochloride 21.6 g. (0.1 mole) of N-2-propynyl-bis-2-chloroethylamine hydrochloride in 100 ml. of isopropanol was treated dropwise with a solution of 23.7 g. (0.4 mole) of n-propylamine and 50 ml. of isopropanol. Dissolution of the solid hydrochloride occurred and was accompanied by a mild exothermic reaction. The resulting light yellow solution was stirred and refluxed for a period of six hours, during which time the reaction mixture became quite dark. The mixture was dissolved in water, made strongly basic with sodium hydroxide, and extracted with ether. The ether was removed by stripping to give a residual oil which was distilled in vacuum. An almost colorless oil was collected at 96–98° C./6 mm. of mercury. Yield: 10.2 g. (61.5% of theory); melting point of the piperazine dihydrochloride compound: 260–262° C.

ANALYSIS

|   | Calculated (Percent) | Found (Percent) |
|---|---|---|
| C | 50.21 | 50.16 |
| H | 8.42 | 8.32 |
| N | 11.18 | 11.50 |

PHARMACOLOGY

The lethal dose 50 (LD50) for oral administration (gastric intubation) of this compound to rats was 1015 mg./kg. Tremors and convulsions were produced by lethal doses after a latency of about three hours. Prior to the tremors and convulsions and at sublethal doses, sedation was observed.

EXAMPLE 2

N-2-propynyl-N'-t-butylpiperazine dihydrochloride

A slurry of 43.2 g. (0.2 mole) of N-2-propynyl-bis-2-chloroethylamine hydrochloride and 200 ml. of isopropanol was treated dropwise with a solution of 58.4 g. (0.8 mole) of tertiary butylamine and 100 ml. of isopropanol. No exotherm was noted during addition.

After refluxing the solution for six hours the excess solvent was removed by stripping leaving a residual brown oil. The oil was treated with caustic solution and the superior oily layer separated from the aqueous layer. The aqueous layer was extracted with ether and the extracts combined with the oily layer. The ether was removed by stripping and the residue distilled in vacuo. Eight grams of a white crystalline solid was collected at 88–94° C./1.0 mm. of mercury. The solid was dissolved in ether and the solution treated with dry hydrogen chloride whereupon the dihydrochloride separated from the solution. The salt melted at 265–268° C. after recrystallization from methanol-ethylacetate. The yield was 10.0 g. (20% of theory).

ANALYSIS

|   | Calculated (Percent) | Found (Percent) |
|---|---|---|
| C | 52.30 | 52.25 |
| H | 8.70 | 8.93 |
| N | 11.10 | 11.13 |

PHARMACOLOGY

The lethal dose 50 (LD50) for oral administration (gastric intubation) of this compound to rats was 795 mg./kg. Lethal doses produced tremors and convulsions.

This compound exhibited antihistaminic activity. A concentration of 1 mcg./ml. produced a 9% decrease in the spasms induced in segments of isolated guinea pig ileum by 0.5 mcg./ml. of histamine dihydrochloride.

EXAMPLE 3

*N-2-propynyl-N'-t-octylpiperazine dihydrochloride*

N-2-propynyl-bis-2-chloroethylamine hydrochloride (43.2–0.2 mole) in 200 ml. of isopropanol were treated dropwise with tertiary octylamine (103.3 g.–0.8 mole) in 100 ml. of isopropanol. During the addition all the crystals went into the solution. There was no exotherm. The solution was brought to reflux for 6 hours. The compound was then stripped of excess solvent, leaving light brown crystals in a brown oil. Water was added and the solution made strongly basic with sodium hydroxide; the two layers that formed were separated, the aqueous layer being extracted with benzene. The extract was added to the top oil. The benzene was stripped from the solution, leaving a brown oil which was fractionally distilled and collected at 120–126° C./.075 mm. The product was a clear oil. The compound was then dissolved in ether and hydrogen chloride was bubbled into the solution, with a crop of white crystals forming which were filtered and recrystallized in hot isopropanol. The yield was 30.2 g. (48.5% of theory); melting point: 217–220° C.

ANALYSIS

|   | Calculated (Percent) | Found (Percent) |
|---|---|---|
| C | 58.40 | 56.06 |
| H | 9.80 | 9.65 |
| N | 9.00 | 9.07 |

PHARMACOLOGY

The lethal dose 50 (LD50) for oral administration gastric intubation) of this compound to rats was 735 mg./kg. Lethal doses produced tremors and convulsions.

This compound exhibited anticholinergic activity. A concentration of 1 mcg./ml. produced a 4% decrease in the spasms induced in segments of isolated guinea pig ileum by 1 mcg./ml. of acetylcholine bromide.

EXAMPLE 4

*N-2-propynyl-N'-phenylpiperazine dihydrochloride*

A slurry of 21.6 g. (0.1 mole) of N-2-propynyl-bis-2-chloroethylamine hydrochloride and 140 ml. of isopropanol was treated dropwise with a solution of 37.2 g. (0.4 mole) of aniline and 50 ml. isopropanol. The solid gradually went into solution, but there was no exotherm. The resulting light orange solution was brought to reflux and was maintained at reflux for a period of six hours. The reaction mixture was cooled, poured into water, and made strongly basic by adding solid sodium hydroxide. The organic layer was extracted into ether and the combined ether extracts dried over sodium sulfate. After removing the ethyl ether by stripping and distilling the residual oil in vacuo, a pale yellow oil was collected at 147° C./4 mm. of mercury. The oil soon solidified in the receiver. The piperazine dihydrochloride compound melted at 238–240° C. with decomposition.

ANALYSIS

|   | Calculated (Percent) | Found (Percent) |
|---|---|---|
| C | 57.14 | 56.50 |
| H | 6.64 | 6.37 |
| N | 10.25 | 10.45 |

PHARMACOLOGY

The lethal dose 50 (LD50) for oral administration (gastric intubation) of this compound to rats was 735 mg./kg. Subhypnosis (loss of righting reflex in the hindquarters) and hypnosis (total loss of the righting reflex) were produced by lethal doses. At sublethal doses sedation was observed.

EXAMPLE 5

*N-2-propynyl-N'-benzhydrylpiperazine dihydrochloride*

A solution of 28.5 g. (0.158 mole) of N-2-propynyl-bis-2-chloroethylamine and 100 ml. of isopropanol was treated dropwise with 50 ml. isopropanol solution containing 63.0 g. (0.344 mole) benzhydrylamine. The resulting colorless solution was heated to reflux and stirred for a period of 7 hours. During the reflux period, the mixture became yellow and crystals began to separate from the solution as the length of the reflux time continued. The mixture was allowed to stand overnight at room temperature. The mixture was filtered after chilling to yield slightly more than the equivalent amount of benzhydrylamine hydrochloride. The filtrate was concentrated to a thick oil which was taken up in water, solution basified, and the oil which separated extracted into ether. After stripping off the ether, the residual oil was distilled through a short path and a viscous oil was collected at 205–210°/4 mm. pressure. The oil gave a negative test for chloride ion by the silver nitrate test. The oil was dissolved in ether and treated with dry hydrogen chloride. The solid which separated was recrystallized from the methanol-ethyl acetate combination, to give colorless needles melting at 234–236° C.

ANALYSIS

|   | Calculated (Percent) | Found (Percent) |
|---|---|---|
| C | 66.11 | 66.04 |
| H | 6.65 | 6.39 |
| N | 7.71 | 7.89 |

PHARMACOLOGY

The lethal dose 50 (LD50) for oral administration (gastric intubation) of this compound to rats was 185 mg./kg. Increased activity and tremors were produced at both lethal and sublethal doses.

This compound exhibited antihistaminic activity. A concentration of 1 mcg./ml. produced a 32% decrease in the spasms induced in segments of isolated guinea pig ileum by 0.5 mcg./ml. of histamine dihydrochloride.

This compound also showed anticholinergic activity. A concentration of 1 mcg./ml. produced a 9% decrease in the spasms induced in segments of isolated guinea pig ileum by 1 mcg./ml. of acetylcholine bromide.

EXAMPLE 6

*N-2-propynyl-N'-cyclohexylpiperazine dihydrochloride*

A solution of 21.6 g. (0.1 mole) of N-2-propynyl-bis-2-chloroethylamine hydrochloride in 150 ml. of isopropanol and 39.6 g. (0.4 mole) of cyclohexylamine in 50 ml. of isopropanol was stirred and refluxed for a period of 6 hours. After cooling to room temperature the reaction mixture was poured into water, the solution made strongly basic by the addition of caustic and the oil which separated was extracted into ether. After stripping off the ether, a brown oil remained which was subjected to fractional distillation with negative results. The oil was, therefore, extracted with a 10% solution of hydrochloric acid, the acid extracts combined, made basic by the addition of caustic and the oil which separated again extracted by diethyl ether. After drying over sodium sulfate the ethereal solution was treated with dry hydrogen chloride. In order to purify the dihydrochloride, it was dissolved in water, treated once with Darco and the aqueous solution concentrated to a yellow oil. The yellow oil crystallized readily when triturated with a combination of acetone and ethyl acetate. The colorless compound melted at 223–226° C.

PHARMACOLOGY

The lethal dose 50 (LD50) for oral administration (gastric intubation) of this compound to rats was 865 mg./kg. Tremors and convulsions were produced by lethal doses and tremors by sublethal doses. Sedation was noted at still smaller sublethal doses.

This compound exhibited antihistaminic activity. A concentration of 1 mcg./ml. produced a 4% decrease in the spasms induced in segments of isolated guinea pig ileum by 0.5 mcg./ml. of histamine dihydrochloride.

This compound also showed anticholinergic activity. A concentration of 1 mcg./ml. produced a 9% decrease in the spasms induced in segments of isolated guinea pig ileum by 1 mcg./ml. of acetylcholine bromide.

EXAMPLE 7

*N-2-propynyl-piperazine dihydrochloride*

A solution of 43.2 g. (0.2 mole) of N-2-propynyl-bis-2-chloroethylamine hydrochloride in 50 ml. of methanol and 34.0 g. (2.0 moles) of anhydrous ammonia in 250 ml. of methanol was charged to a 500 ml. 3-neck flask. The reaction mixture was heated to 100° C. and at 105 p.s.i. for 8 hours and, after having cooled to room temperature overnight, it was filtered and stripped of excess solvent. The mixture was dissolved in an equal amount of water and made strongly basic with sodium hydroxide. No separation was noted. The mixture was extracted with ether four times and the extracts were combined and dried with sodium sulfate. Hydrogen chloride was passed into the solution with a crop of tan crystals forming. The compound thus obtained was recrystallized in boiling methanol and ethyl acetate and cooled overnight in a refrigerator. Yield: 5 g. (12.7% of theory); melting point: 231–235° C.

ANALYSIS

|   | Calculated (Percent) | Found (Percent) |
|---|---|---|
| C | 42.60 | 42.77 |
| H | 7.10 | 7.52 |
| N | 14.20 | 14.03 |

To summarize briefly, this invention relates to N-2-propynyl-N'-substituted-piperazines of the general formula:

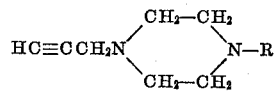

wherein R represents hydrogen, lower alkyl, aryl, diaralkyl or alicyclic groups, and their acid addition salts which have pharmaceutically acceptable anions.

In the formula above, R is preferably a propyl, butyl, or octyl radical or a phenyl, benzhydryl or cyclohexyl radical, and these R substituents are denominative of the preferred species within the purview of this invention.

What is claimed is:
1. N-2-propynyl-N'-t-butylpiperazine.
2. N-2-propynyl-N'-t-octylpiperazine.
3. N-2-propynyl-N'-phenylpiperazine.
4. N-2-propynyl-N'-benzhydrylpiperazine.
5. N-2-propynyl-N'-cyclohexylpiperazine.
6. A compound selected from the group consisting of N-2-propynyl-N'-substituted piperazine bases of the formula:

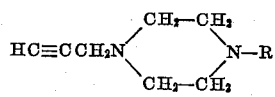

wherein R is a member of the group consisting of propyl, butyl, octyl, phenyl, benzhydryl and cyclohexyl radicals, and acid addition salts of the said bases having pharmaceutically accepted anions.

7. N-2-propynyl-N'-n-propylpiperazine.

References Cited in the file of this patent

UNITED STATES PATENTS

| 2,636,032 | Weston et al. | Apr. 23, 1953 |
| 2,858,312 | Olin | Oct. 28, 1958 |
| 2,858,313 | Olin | Oct. 28, 1958 |
| 2,861,072 | Weston et al. | Nov. 18, 1958 |

FOREIGN PATENTS

| 529,491 | Canada | Aug. 21, 1956 |
| 790,800 | Great Britain | Feb. 19, 1958 |

OTHER REFERENCES

Harfenist et al.: Jour. Amer. Chem. Soc., vol. 79, pp. 2215–2216 (1957).